(12) United States Patent
Bradley

(10) Patent No.: US 8,495,806 B2
(45) Date of Patent: Jul. 30, 2013

(54) TOOLING

(75) Inventor: Robert J. Bradley, Nottingham (GB)

(73) Assignee: Rolls-Royce PLC, London (GB)

( * ) Notice: Subject to any disclaimer, the term of this patent is extended or adjusted under 35 U.S.C. 154(b) by 1036 days.

(21) Appl. No.: 12/458,950

(22) Filed: Jul. 28, 2009

(65) Prior Publication Data

US 2010/0071181 A1    Mar. 25, 2010

(30) Foreign Application Priority Data

Sep. 22, 2008   (GB) .................................. 0817188.6

(51) Int. Cl.
| | | |
|---|---|---|
| B23P 19/02 | (2006.01) | |
| B23P 11/00 | (2006.01) | |
| B21D 39/03 | (2006.01) | |
| B66C 1/00 | (2006.01) | |
| E21B 19/06 | (2006.01) | |
| B25B 23/08 | (2006.01) | |
| B25B 23/10 | (2006.01) | |
| B25B 27/14 | (2006.01) | |

(52) U.S. Cl.
USPC ............... 29/235; 29/426.6; 29/26.1; 294/96; 81/445

(58) Field of Classification Search
USPC .................. 29/235, 426.6, 243.57, 229, 252, 29/261, 724; 81/445, 176.15; 294/89, 96
See application file for complete search history.

(56) References Cited

U.S. PATENT DOCUMENTS

| | | | | | |
|---|---|---|---|---|---|
| 1,470,310 | A | * | 10/1923 | Winchell | 29/261 |
| 1,711,675 | A | * | 5/1929 | Fetter | 188/367 |
| 1,794,494 | A | * | 3/1931 | Noble | 29/261 |
| 1,919,343 | A | * | 7/1933 | Payne | 188/2 R |
| 2,303,560 | A | * | 12/1942 | Knight | 29/261 |
| 2,358,142 | A | * | 9/1944 | Carlin | 29/243.57 |
| 3,030,700 | A | * | 4/1962 | Jensen | 29/229 |
| 3,111,749 | A | * | 11/1963 | Loxterman | 29/235 |
| 3,119,174 | A | * | 1/1964 | Wokeck | 29/235 |
| 4,003,782 | A | * | 1/1977 | Farrelly | 156/552 |
| 4,117,581 | A | * | 10/1978 | Brodie | 29/261 |
| 4,291,454 | A | * | 9/1981 | Sawaryn | 29/426.6 |
| 4,370,915 | A | * | 2/1983 | Gustavsson et al. | 89/47 |
| 4,649,615 | A | * | 3/1987 | Hundley | 29/261 |
| 4,782,573 | A | * | 11/1988 | Le Floch | 29/235 |
| 4,820,000 | A | * | 4/1989 | Jacobson | 312/1 |
| 4,865,401 | A | * | 9/1989 | Jacobson | 312/1 |
| 5,094,656 | A | * | 3/1992 | Hatchell et al. | 493/193 |
| 5,325,992 | A | * | 7/1994 | Koller et al. | 221/63 |

(Continued)

FOREIGN PATENT DOCUMENTS

GB    337107    10/1930

*Primary Examiner* — Lee D Wilson
*Assistant Examiner* — Alvin Grant
(74) *Attorney, Agent, or Firm* — Oliff & Berridge, PLC

(57) ABSTRACT

An expander for concentrically expanding a cylindrical member, the expander with a tapered block, a plurality of segments, each having an inner surface at least partially in contact with the tapered surface of the tapered block and the segments arranged to move in concert with each other relative to the block, and a pair of engaging features being provided for each segment, each pair comprising a first engagement feature on one of the segments and a second engagement feature on the block, the pairs of engaging features being arranged to maintain equal circumferential spacing of the segments around the block and to constrain movement of the segments in a direction that is coaxial with the block, each pair of engaging features being located away from the circumferential edges of their respective segment.

22 Claims, 3 Drawing Sheets

U.S. PATENT DOCUMENTS

| | | | |
|---|---|---|---|
| 5,419,027 A * | 5/1995 | McPeak et al. | 29/252 |
| 5,465,549 A * | 11/1995 | Lummus | 53/138.8 |
| 5,495,650 A * | 3/1996 | Crepel et al. | 29/235 |
| 6,561,403 B1 * | 5/2003 | Kannankeril et al. | 225/96 |
| 6,665,918 B1 * | 12/2003 | Williams | 29/259 |
| 7,484,461 B2 * | 2/2009 | Britcher | 104/89 |
| 7,914,011 B1 * | 3/2011 | Bromer | 280/11.211 |
| 2003/0192158 A1 * | 10/2003 | Reale | 29/235 |
| 2010/0071181 A1 * | 3/2010 | Bradley | 29/235 |

* cited by examiner

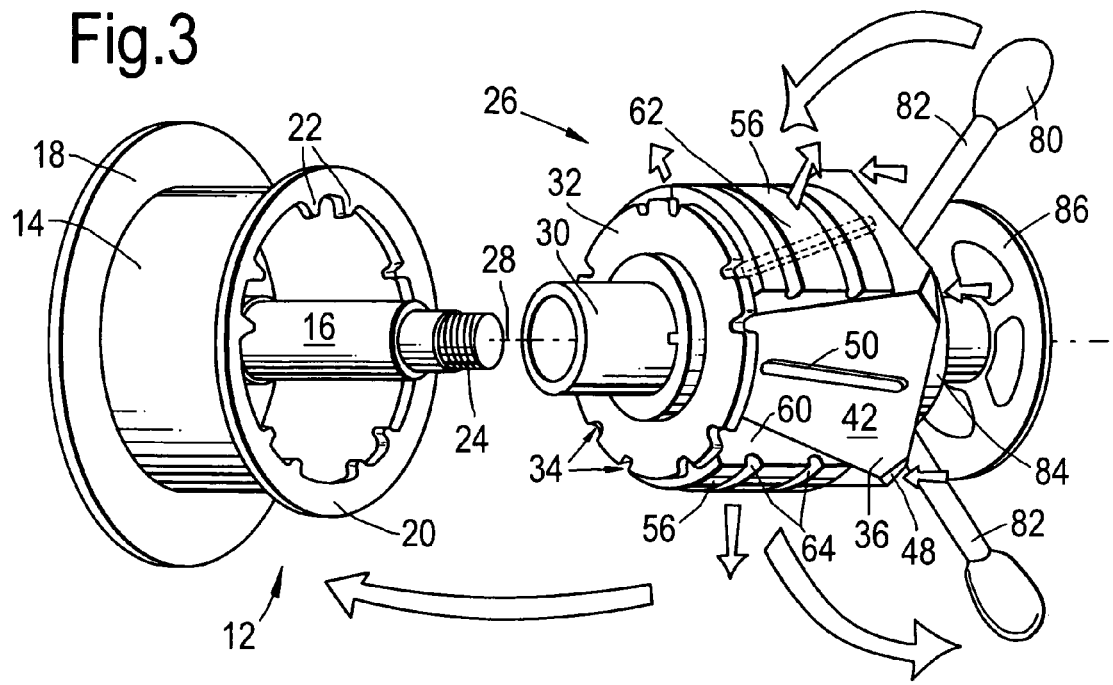
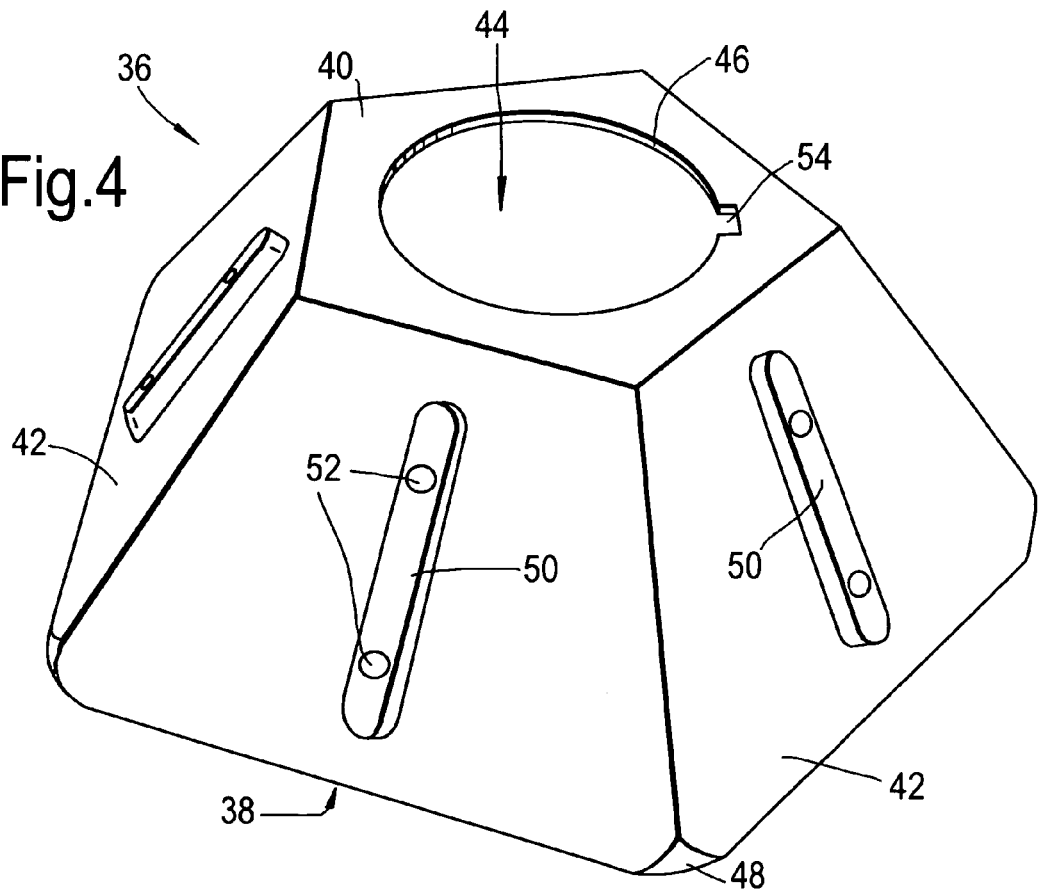

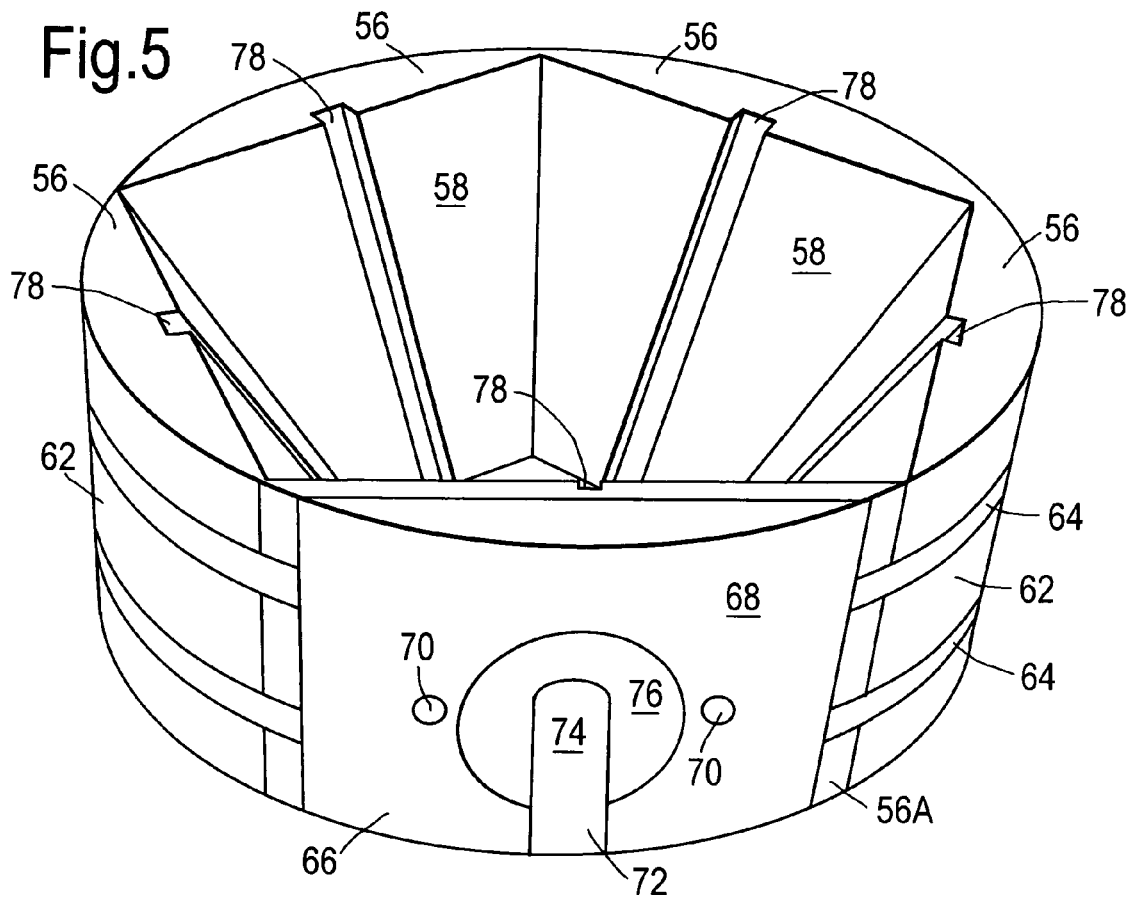
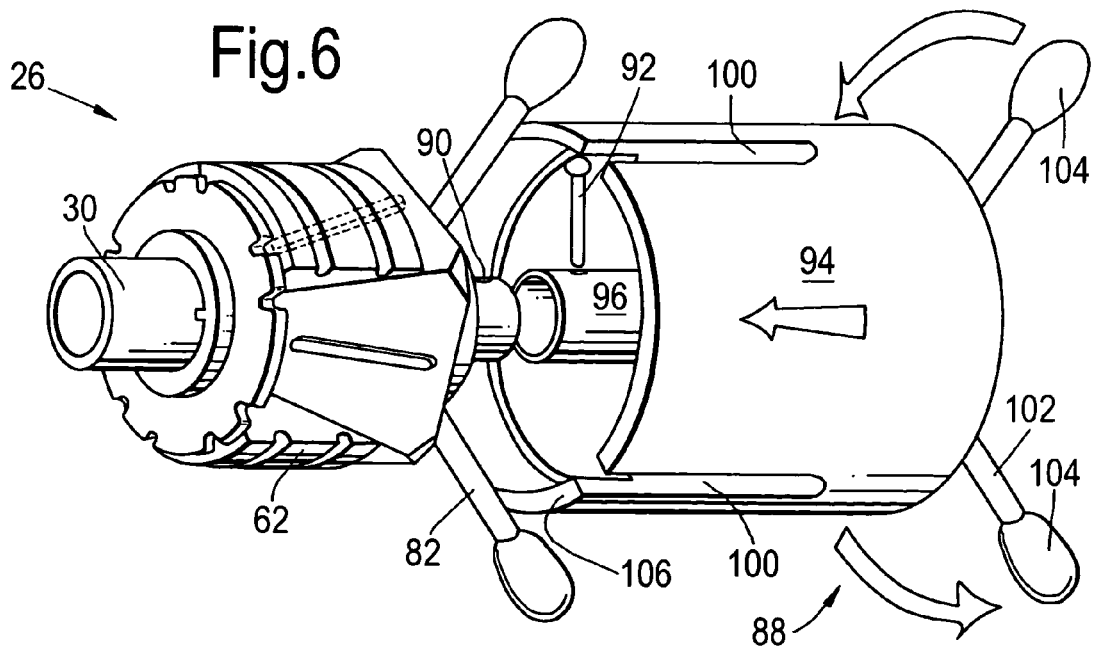

TOOLING

The present invention relates to tooling and is particularly related to tooling for fitting brake bags to aircraft wheels.

Aircraft, particularly historic aircraft, have brake bags fitted on a brake unit around the axle of each of their wheels. The brake bags inflate when the pilot applies the brakes, thereby pushing brake shoes against the rotating parts to effect braking. Typically the brake unit is a hollow cylinder with a radially outwardly extending flange at each end of the cylinder. One flange seats against other components of the aircraft, for example the chassis, and is connected thereto. The other flange serves to retain the brake bag in position once fitted.

Operational wear or exceptional circumstances can damage one or more of the brake bags fitted to an aircraft so that it requires replacement. Typically the brake bags are sliced to remove them from the brake units. The replacement bag must be eased over the retaining flange and seated around the cylinder, between the two flanges.

The normal way to fit brake bags is by hand. The bag is stretched to fit over the retaining flange by pulling the walls by hand and inserting levers, similar to tyre levers. It is then eased further over the flange until it seats in position. The bag may need to be rotated relative to the brake unit to align it so that the inflation valve can be pushed through an aperture in the brake unit to be connected to the inflation gas supply. Typically two people are needed to fit the bag using this method.

One disadvantage of this method of fitting a brake bag is that it requires considerable force to stretch the brake bag sufficiently to clear the retaining flange. Using just hands and levers it is almost impossible to simultaneously and evenly stretch the bag around the whole of its circumference to clear the retaining flange. This results in parts of the inner wall of the bag resting on or scraping against the retaining flange during fitting, which can cause both surface and interior damage or weakening such as delamination, tearing or puncturing of the bag. Interior damage is particularly problematic because it only becomes apparent when the brakes are applied and the gas pressure ruptures the damaged area. This is a severe safety problem since it immediately prevents the brakes from functioning. Furthermore, the retaining flange is part of the cast brake unit and is relatively weak in response to axial forces. This means that it too may be damaged during fitting, requiring in situ repair or replacement of the whole unit.

A second disadvantage of this method of fitting the brake bags is that the fitters' hands are liable to be scraped, cut and squashed during fitting.

A third disadvantage of this method is that it takes a relatively long time to fit each brake bag, due to the difficulties of stretching the bag sufficiently to clear the retaining flange and then to ease it fully into position with the inflation valve correctly aligned. Typically it can take in the order of 2 to 3 hours to fit each bag.

It is therefore desirable to provide a portable device for expanding and fitting brake bags to aircraft axles that is more effective, quicker and safer than the prior art methods.

The present invention seeks to provide tooling for expanding brake bags and the like that seeks to address the aforementioned problems.

Accordingly the present invention provides an expander for concentrically expanding a cylindrical member, the expander comprising:
 a tapered block;
 a plurality of segments, each having an inner surface at least partially in contact with the tapered surface of the tapered block and the segments arranged to move in concert with each other relative to the block; and
 a pair of engaging features being provided for each segment, each pair comprising a first engagement feature on one of the segments and a second engagement feature on the block, the pairs of engaging features being arranged to maintain equal circumferential spacing of the segments around the block and to constrain movement of the segments in a direction that is coaxial with the block, each pair of engaging features being located away from the circumferential edges of their respective segment.

The expander of the present invention provides a quicker, safer and less painful way to fit a replacement brake bag, being the cylindrical member, to a brake unit of an aircraft, particularly a historic aircraft.

The tapered block may be a regular polygon in section or may be frustoconical. These shapes are beneficial in causing the concentric expansion of the cylindrical member.

The inner surface of each segment may have a complementary shape to at least part of the tapered block to provide a more secure contact therebetween to constrain the movement of the segments relative to the block.

Each of the plurality of segments may be arranged to move in a direction having an axial component and a radial component. Preferably the plurality of segments move in a direction having a common axial component and a diverging or converging radial component. Thus axial movement of the segments causes simultaneous radial expansion of the other surfaces of the segments.

The expander may further comprise means to move the plurality of segments relative to the block. This may be mechanical drive means, particularly at least one handle. A person may then operate the expander single-handedly reducing the manpower required by the prior art method of fitting a brake bag to a brake unit.

The expander may further comprise O-rings located outwardly of the plurality of segments to move them in concert with each other. The O-rings or similar arrangement constrain the segments together and assist in maintaining the circumferential spacing between them.

The expander may be connected to an adjacent component by connection means. The expander may further comprise orientation fixing means for fixing the relative position and orientation of the expander and the adjacent component. The expander may further comprise means to impel the cylindrical member in an axial direction towards the adjacent component with a circumferentially equal force. Preferably the means to impel prevents further expansion of the expander. More preferably the means to impel comprises a hollow cylindrical member. These additional features enable use of the expander to expand a cylindrical member, preferably a brake bag, that is then fitted to an adjacent component. The means to impel allows the cylindrical member to be pushed from the expander with an equal force around its whole circumference, providing a more constant and equal force than is possible with the prior art method of pushing the brake bag, cylindrical member, onto the brake unit, adjacent component, by hand.

Other aspects of the present invention provide a tapered block and a segment for the above described expander. These are replaceable parts that can advantageously be manufactured separately and assembled together as part of a new or repaired expander.

A further aspect of the present invention provides an aircraft brake bag expander comprising:
 connection means for connection to an aircraft axle;
 mechanical drive means;

orientation fixing means for fixing the relative position and orientation of the expander and the aircraft axle; and an expander as described above.

Advantageously, the expander is connected to the aircraft axle to enable a brake bag to be expander and then eased onto the brake unit without requiring the prior art manual stretching of the brake bag with the associated disadvantages outlined above.

The connection means may comprise complementary threaded members. This makes connection quick and easy. The mechanical drive means may comprise at least one handle so a person can operate the expander single-handedly. The orientation fixing means may comprise at least a part suitable for locking with at least part of the aircraft axle. This may be by a complementary key and keyway arrangement.

The expander may further comprise a recess in its peripheral surface for engaging a protruding part of a brake bag to be expanded, such as an inflation valve. This orientates the brake bag relative to the expander, and thence to the aircraft axle. It also prevents the brake bag being distorted in the region of the inflation valve as it is expanded by the expander.

The present invention will be more fully described by way of example with reference to the accompanying drawings, in which:

FIG. 3 is a schematic perspective view of apparatus including the expander according to the present invention.

FIG. 4 is a schematic perspective view of the tapered block of the expander according to the present invention.

FIG. 5 is a schematic perspective view of the expander blocks of the expander according to the present invention.

FIG. 6 is a schematic perspective view of the expander as in FIG. 3 and an associated hollow driver according to a second aspect of the present invention.

Figure 1:
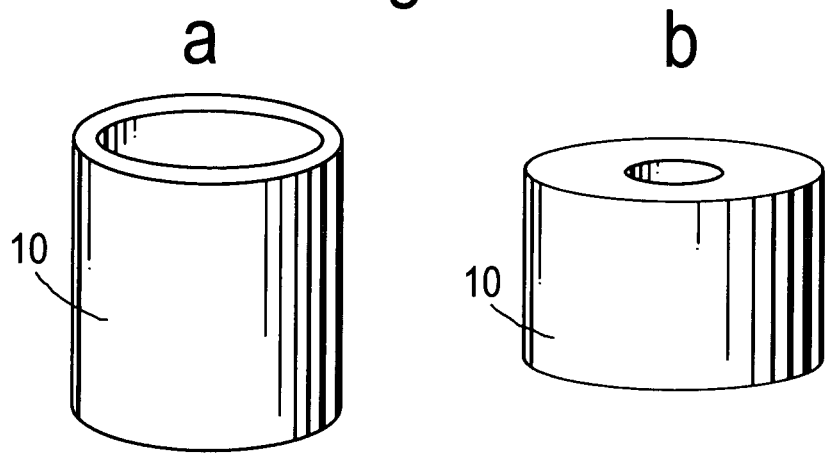
FIG. 1 is a pair of schematic perspective illustrations of a brake bag in its uninflated (FIG. 1a) and inflated (FIG. 1b) states.

Each brake bag 10 is toroidal, as is shown in FIG. 1, with an inflation valve (not shown) suitably positioned in the inner wall for connection to a gas supply. In its uninflated state (FIG. 1a), the inner and outer walls lie substantially adjacent to each other whereas in its inflated state (FIG. 1b) the walls are spaced apart from each other so that a section through the bag is substantially circular. The bags comprise rubber-treated canvas or a similar material so that they are relatively stiff. However, they are resiliently elastic enough to enable inflation but to return to their uninflated shape when the gas supply is removed.

An exemplary embodiment of the expander according to the present invention is shown in FIG. 3. A brake unit 12 is shown such as is typical on models of historic aircraft including the Spitfire, Firefly, Lancaster, Hurricane, Seafury and Meteor. The brake unit 12 comprises a hollow cylindrical body 14 that is coaxial with an axle 16 for mounting the aircraft wheel upon. There is an aperture (not shown) extending through the cylindrical body 14 that receives therethrough the inflation valve of the brake bag 10. For convenience the inflation valve is usually located at bottom dead centre of the brake bag 10 in relation to the aircraft orientation on flat ground, but may be located anywhere around the circumference of the cylindrical body 14. Similarly the axial distance of the inflation valve from either end of the cylindrical body 14 is determined by engineering design and is usually towards the aircraft. Extending radially outwardly from one end of the cylindrical body 14 is an attachment flange 18. This attachment flange 18 is secured to other parts of the aircraft, for example the chassis, to support the brake unit 12. The flange 18 may be annular or may resemble a plate that closes off the cylindrical body 14.

Figure 2:
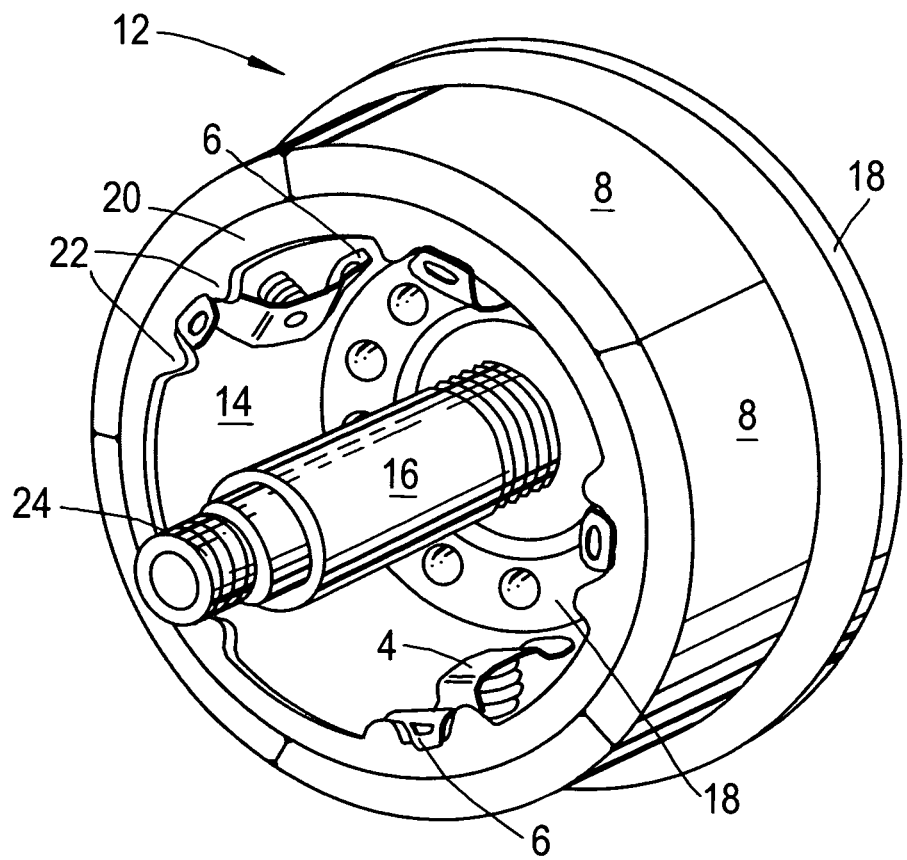
FIG. 2 is a schematic perspective view of a brake unit.

At the other end of the cylindrical body 14 is an annular retaining flange 20 extending radially outwardly. Extending radially inwardly from the inner surface of the retaining flange 20 is a plurality of protrusions 22. The aperture defined by the shape of the retaining flange 20 and protrusions 22 is sometimes referred to as a petal-shaped aperture. Typically the brake unit 12 is a single cast component with the flanges 18, 20 and protrusions 22 formed together with the cylindrical body 14. The brake unit 12 may be cast from magnesium. The protrusions 22 are arranged to interact with brake shoes that are well understood in the art. FIG. 2 shows the brake unit 12 mounted to the aircraft via the attachment flange 18 so that the aircraft axle 16 extends coaxially therewith. The brake bag 10, which is not visible, is seated around the cylindrical body 14 of the brake unit 12 between the attachment 18 and retaining 20 flanges. Radially outwardly of the brake bag 10 are brake shoes 8, five in the illustrated embodiment. Each brake shoe 8 has a pair of tongues 6 extending from its axially forward and rear edges that slide through complementary slots in the cylindrical body 14, located between pairs of protrusions 22 at the axially forward edge. A retaining clip 4 is hooked through an aperture in each tongue 6 to hold the brake shoe 8 in position, with the brake bag 10 trapped between the brake shoes 8 and the cylindrical body 14. The retaining clip 4 is biased towards the cylindrical body 14 by a compression spring. The brakes then function in conventional manner whereby the brake bag 10 is inflated by gas, which pushes the brake shoes 8 outwards against the rotating components of the wheel to effect braking. On deflation of the brake bag 10 the retaining clips 4 cause the brake shoes 8 to apply a restoring force to the brake bag 10.

The axle 16 extends away from the aircraft and terminates in a threaded portion 24. In normal use of the axle 16 this threaded portion 24 engages a wheel retaining nut. As will become apparent, the expander apparatus according to the present invention also engages with the threaded portion 24 of the axle 16.

An expander 26 according to the present invention is shown in FIG. 3. The expander 26 is substantially symmetrical about an axis 28 and is mounted about a hollow shaft 30. The shaft is sized to slide over the axle 16 and is internally threaded so that it can be screwed onto the threaded portion 24 of the axle 16 to secure the expander 26 thereto. Secured to the shaft 30 is a petal-shaped plate 32, which has a plurality of recesses 34 that mesh with the protrusions 22 on the brake unit 12 when the expander 26 is secured to the axle 16. The meshing locks the orientation of the expander 26 relative to the axle 16 so that it does not rotate when torsional forces are applied thereto.

A tapered block 36 is mounted around the shaft 30 and located axially behind and spaced apart from the petal plate 32 (further from the aircraft when the expander 26 is mounted to the axle 16). In the preferred embodiment of the present invention the tapered block 36 is a pentagonal pyramid having a larger base 38 and a smaller top 40, the shaft 30 passing through both, and five tapered surfaces 42 that are regular trapezoids, as can be seen more clearly in the enlargement of FIG. 4. The tapered block 36 is oriented so that the smaller top surface 40 is adjacent to the petal plate 32 and the block 36 becomes radially wider as it extends axially away from the petal plate 32.

A central bore 44 extends from the top 40 to the base 38 of the tapered block 36 and is dimensioned so as to receive the shaft 30 therethrough. The upper edge 46 of the bore may be chamfered or radiused to assist in sliding the shaft 30 through the bore 44 during assembly of the expander 26. Extending parallel and adjacent to the central bore 44 is a recessed internal keyway 54. This engages with a key provided on the shaft 30, extending for at least some of its axial length. The engagement of the key with the internal keyway 54 of the tapered block 36 locks the orientation of the tapered block 36 with respect to the shaft 30 so that it cannot rotate under the application of torsional forces during use of the expander 26.

The lower portion of the vertices between tapered surfaces 42 may comprise truncated corners 48. This enables a smaller block of raw material block to be used to produce the tapered block 36. Alternatively the vertices may be straight all the way to meet the base 38 at a point.

Located centrally on each tapered surface 42 is a key 50, sometimes referred to in the art as a feather key. Each key 50 is a substantially rectangular block having rounded ends for smoother engagement with other components, to be described below. The keys 50 extend over most of the axial height of the tapered surfaces 42 but are narrow relative to the width of the surfaces 42. Each key 50 is fastened to the tapered block 36 by any suitable fastening means including screws 52, nails, adhesive and welding.

Preferentially, the tapered block 36 is machined from phosphor bronze (Pb1) and the keys 50 are brass. Thus the tapered block 36 is relatively self-lubricating meaning it is not necessary to apply oil or other lubricants for the smooth operation of the expander 26. However, other materials can be used for any of the components without detriment to the apparatus of the present invention.

Referring to FIG. 3 again, mounted radially outside the tapered block 36 is a set of tapered expander segments or blocks 56, five in this embodiment. In FIG. 3 one of these expander blocks 56 is omitted to reveal the tapered block 36 radially within. Each expander block 56 has side surfaces 60 that may abut the adjacent expander blocks 56. The side surfaces 60, in accordance with the tapered shape of the expander blocks 56, are generally triangular. The expander blocks 56 have inner surfaces 58 that complement the tapered surfaces 42 of the tapered block 36 by sloping at the same angle to the axis 28. The expander blocks 56 are arranged so that they are thickest adjacent to the petal plate 32 and thinnest at their opposite axial extent. The set of expander blocks 56 are described with reference to the enlargement of FIG. 5.

The five expander blocks 56 are arranged with their side surfaces 60 abutting so that their inner surfaces 58 form a pentagonal pyramid-shaped aperture that is the complement of the tapered block 36. The outer surfaces 62 are shaped as the segment of a cylinder so that the set of outer surfaces 62 forms a generally smooth cylinder. There are two recesses or grooves 64 machined into each outer surface 62 that form a pair of annular grooves 64, each of which receives an O-ring to hold together the set of expander blocks 56.

One of the expander blocks 56A is modified so that it does not have a curved outer surface 62. Instead, the expander block 56A has a flat surface that extends parallel to axis 28 when the expander 26 is assembled. Mounted on this flat surface is a panel 66 that has a flat inner surface to abut the modified expander block 56A and a curved outer surface 68 that aligns with the outer surfaces 62 of the adjacent expander blocks 56 to form the cylindrical outer shape. The panel 66 is therefore a constant sized segment of a circle in cross-section and is preferably formed of hardened steel or similar material. It is fastened to the modified expander block 56A via any suitable fastening means 70 such as screws, nails, adhesive or welding. The flat surfaces of the modified expander block 56A and the panel 66 are arranged so that the O-rings are encapsulated in grooves 64 that may be machined in surfaces of either or both of the modified expander block 56A and the panel 66 as deemed appropriate.

A recess 72 is provided in the circumferential centre of the panel 66 that is arranged to receive, in use, the inflation valve of the brake bag 10 to be fitted. The recess 72 is shaped to complement the inflation valve, and may have any shape suitable for this purpose. As illustrated, the recess 72 is mushroom shaped having the stalk portion 74 extending from the edge of the panel 66, at the axial end where the expander blocks 56 are thickest. Both the stalk portion 74 and the head portion 76 of the recess 72 are shallowest towards this axial end and become deeper into the panel 66 at their distal extents. The recess 72 profiles the outer surface 68 of the panel 66 so that the brake bag 10 is not distended by the inflation valve. It also locates the inflation valve of the brake bag 10 at a known position around the circumference of the expander 26 so that it may be simply aligned with the aperture in the cylindrical body 14 of the brake unit 12 for engagement therewith when the brake bag 10 is fitted onto the brake unit 12.

Each of the expander blocks 56 has a keyway 78 machined into its inner surface 58 to form a longitudinal recess from one axial end to the other. The keyways 78 are located in the circumferential centre of the inner surfaces 58 and are dimensioned such that they may engage with the keys 50 on the tapered surfaces 42 of the tapered block 36.

Referring again to FIG. 3, the position of the expander blocks 56 is shown with respect to the tapered block 36. Each keyway 78 in an expander block 56 engages with a respective one of the keys 50 on the tapered block 36 to constrain movement therebetween to a single axis. Thus each expander block 56 can move axially, and radially away from or towards the petal plate 32 on a plane at a pre-determined angle to the axis 28 governed by the angle of taper of the tapered surfaces 42. The ends of the keys 50 are curved to enable them to be easily slipped into the keyways 78. The interaction of the keys 50 and keyways 78 ensures that as the expander blocks 56 move axially with respect to the tapered block 36, in a manner to be described hereinafter, the circumferential spacing between them is maintained equal. This is an improvement over prior art expanders wherein there is a tendency for the expander blocks to bunch together around part of the circumference thereby leaving a relatively large, unsupported portion of the brake bag to be expanded, which means the bag experiences an unequal amount and concentration of stress around its circumference.

The expander 26 of the present invention further comprises a handle 80 that is located axially beyond or behind the tapered block 36. This handle 80 comprises three arms 82 that each extend radially outwardly with equal spacing between them. The arms 82 extend beyond the radius of the outer surfaces 62 of the expander blocks 56 and are adapted to enable a person to grip them in order to turn the handle 80 to expand the expander 26. The handle 80 also comprises an annular block portion 84 that is located around the shaft 30 and behind the tapered block 36. The arms 82 are secured to and extend away from this annular block portion 84. The annular block portion 84 is threaded and engages with a corresponding threading on the distal end of the shaft 30. As the arms 82 are rotated clockwise the annular block portion 84 is screwed further onto the shaft 30, thereby driving the tapered block 36 axially towards the petal plate 32. The expander blocks 56 are prevented from moving axially along the shaft 30 with the tapered block 36 by the petal plate 32. Thus, the expander blocks 56 are caused to traverse radially outwardly along the tapered surfaces 42 of the tapered block 36 in the direction dictated by the interaction of the keys 50 and keyways 78. Thus the outer surfaces 62 of the expander blocks 56 define an increasing diameter cylinder as the handle 80 of the expander 26 is rotated clockwise, and the side surfaces 60 of adjacent expander blocks 56 are spaced apart from each other by an increasing circumferential distance.

In this way the tapered block 36 can be pushed along the shaft 30 by a pre-determined distance, governed by the length of the threading on the distal end of the shaft 30 and on the axial length of the gap between the petal plate 32 and the tapered block 36. This axial movement of the tapered block 36 results in a corresponding radial expansion of the outer surfaces 62 of the expander blocks 56.

Therefore, use of the expander 26 of the present invention is as follows. The expander 26, in its unexpanded configuration, has its handle 80 unscrewed sufficiently that the tapered block 36 is spaced from the petal plate 32 and the expander blocks 56 abut each other at their side surfaces 60. Thus the expander blocks 56 define a minimum diameter cylinder. A brake bag 10 is slipped over the expander blocks 56 from the petal plate 32 end when the expander 26 is in the unexpanded configuration. The diameter of the set of expander blocks 56 in this configuration is arranged to be of similar or marginally smaller diameter than the brake bag 10 to be expanded so that the bag 10 may be easily slipped over the expander blocks 56 without stretching being required. The brake bag 10 is aligned so that the inflation valve is seated within the recess 72 in the panel 66 secured to the modified expander block 56A.

The shaft 30 of the expander 26 is then slotted onto the wheel axle 16 and screwed onto the threaded portion 24 of the axle 16. A hand wheel 86, having a threaded shank, is provided at the distal end of the shaft 30 to screw into and lock the expander 26 onto the axle 16 during use of the expander 26. This takes the place of the hexagonal nut that would normally secure a wheel onto the axle 16.

Next the arms 82 of the handle 80 are rotated clockwise to push the expander blocks 56 radially outwardly. This stretches the brake bag 10 in all radial directions simultaneously and applies equal force to substantially the whole surface area of the bag 10. The operator continues to rotate the arms 82 until the internal diameter of the brake bag 10 is slightly larger than the diameter of the retaining flange 20 of the brake unit 12. The brake bag 10 can then be eased axially over the retaining flange 20 and arranged to seat around the cylindrical body 14 of the brake unit 12. The slope of the recess 72 for the inflation valve guides the inflation valve of the brake bag 10 as it is eased over the retaining flange 20.

The expander 26 may then be removed from the axle 16 and reset to the unexpanded configuration by rotating the arms 82 of the handle 80 anticlockwise until the expander blocks 56 abut one another.

Thus the expander 26 of the present invention provides a quicker, safer and less painful way to fit a replacement brake bag 10 to a brake unit 12. The brake bag 10 is stretched uniformly and is supported over substantially the whole of its inner surface area. This reduces the likelihood and opportunity for damage to occur during fitting. The brake unit 12, particularly retaining flange 20, is also protected from damage and stress. There is no requirement to stretch the brake bag 10 by hand, which means fitters are much less likely to be injured. Furthermore, the expander 26 is light enough to be lifted and operated by one person so a single operator can fit a replacement bag 10. The expander 26 provides known, uniform expansion so that brake bags 10 can be fitted quickly and consistently.

Referring now to FIG. 6, an additional aspect of the present invention is a hollow driver 88. The expander 26 is substantially as described with respect to FIG. 3 except that the shaft 30 extends axially beyond the annular block portion 84 of the handle 80 and is provided with an aperture 90 therethrough that is adapted to receive, in use, a bolt 92 or other fastening means. The driver 88 comprises a hollow cylindrical body 94 that is sized to slide over the outer surfaces 62 of the expander blocks 56 when they are in their expanded configuration. The cylindrical body 94 is connected to an internal hollow shaft 96 that has an internal diameter approximately equal to the external diameter of the expander shaft 30 so that it slides around the outside of that shaft 30. The connection may be, for example, by a flat end plate (not shown). The hollow shaft 96 has a corresponding aperture 98 to the aperture 90 so that the bolt 92, or other fastening means, can be inserted through both apertures 98, 90 to secure the two shafts 30, 96 in axial alignment together.

The hollow cylindrical body 94 comprises three slots 100 that extend from the end 106 proximal to the expander 26, when mounted thereto, towards the distal end. These slots 100 are equally spaced circumferentially around the cylindrical body 94 and are arranged and dimensioned to engage around the arms 82 of the handle 80 of the expander 26. This engagement holds the arms 82 in fixed orientation with respect to the expander 26 so that they cannot be further rotated.

Connected to the distal end of the cylindrical body 94, for example to the end plate, or to the distal end of the hollow shaft 96 is a handle 102 that is equivalent to the expander handle 80 and which works in comparable manner. Thus, when the arms 104 of the handle 102 are rotated clockwise the hollow cylindrical body 94 is driven axially towards the expander 26. The proximal end 106 of the cylindrical body 94 abuts the distal edge of the brake bag 10 and propels it axially towards the aircraft to ease it over the retaining flange 20 and into position around the cylindrical body 14 of the brake unit 12.

The driver 88 is advantageous in that it enables the brake bag 10 to be eased from the expander 26 onto the brake unit 12 with a uniform and equal axial force applied around its whole circumference rather than the potentially uneven forces that may occur when it is eased by hand. This is particularly relevant when large diameter brake bags 10 are being fitted, for example on larger aircraft, where the fitter is able to push by hand a relatively smaller section of the bag 10 at any given time.

An alternative arrangement of the driver 88 provides a ledge or step within the axially proximal portion of the hollow cylindrical body 94. This ledge or step is arranged to abut the edge of the brake bag 10 instead of the proximal end 106 of the cylindrical body 94 to ease the bag 10 from the expander 26 and onto the brake unit 12. It may be possible to provide different diameter hollow drivers 88 or an expandable hollow driver 88 so that different diameter brake bags 10 can be eased off the expander 26 and onto the brake unit 12 of an aircraft.

Although the keyways 78 have been described in the expander blocks 56 and the keys 50 on the tapered block 36 the expander 26 of the present invention may be equally achieved with the keyways 78 in the tapered block 36 and the keys 50 on the expander blocks 56.

Other modifications and variations will be apparent to the skilled reader that do not, and should not be taken to, limit the scope of the invention as claimed in the appended claims.

The invention claimed is:

1. An expander for concentrically expanding a cylindrical member, the expander comprising:
 a tapered block;
 a plurality of segments, each having an inner surface at least partially in contact with the tapered surface of the tapered block and the segments arranged to move in concert with each other relative to the block; and a pair of engaging features being provided for each segment, each pair comprising a first engagement feature on one of the segments and a second engagement feature on the block, the pairs of engaging features being arranged to maintain equal circumferential spacing of the segments around the block and to constrain movement of the segments in a direction that is coaxial with the block, each pair of engaging features being located away from the circumferential edges of their respective segment.

2. An expander as claimed in claim 1 wherein the tapered block is a regular polygon in section.

3. An expander as claimed in claim 1 wherein the tapered block is frustoconical.

4. An expander as claimed in claim 1 wherein the inner surface of each segment has complementary shape to at least part of the tapered block.

5. An expander as claimed in claim 1 wherein each of the plurality of segments is arranged to move in a direction having an axial component and a radial component.

6. An expander as claimed in claim 5 wherein the plurality of segments move in a direction having a common axial component and a diverging or converging radial component.

7. An expander as claimed in claim 1 wherein the expander further comprises means to move the plurality of segments relative to the block.

8. An expander as claimed in claim 7 wherein the means to move the plurality of segments comprises mechanical drive means.

9. An expander as claimed in claim 8 wherein the mechanical drive means comprises at least one handle.

10. An expander as claimed in claim 1 wherein the expander further comprises O-rings located outwardly of the plurality of segments to move them in concert with each other.

11. An expander as claimed in claim 1 wherein the expander is connected to an adjacent component by connection means.

12. An expander as claimed in claim 11 further comprising orientation fixing means for fixing the relative position and orientation of the expander and the adjacent component.

13. An expander as claimed in claim 11 further comprising means to impel the cylindrical member in an axial direction towards the adjacent component with a circumferentially equal force.

14. An expander as claimed in claim 13 wherein the means to impel the cylindrical member comprises means to prevent further expansion of the expander.

15. An expander as claimed in claim 13 wherein the means to impel the cylindrical member comprises a hollow cylindrical member.

16. A tapered block for an expander as claimed in claim 1.

17. A segment for an expander as claimed in claim 1.

18. An aircraft brake bag expander comprising:

connection means for connection to an aircraft axle;

mechanical drive means;

orientation fixing means for fixing the relative position and orientation of the expander and the aircraft axle; and an expander as claimed in claim 1.

19. An aircraft brake bag expander as claimed in claim 18 wherein the connection means comprises complementary threaded members.

20. An aircraft brake bag expander as claimed in claim 18 wherein the mechanical drive means comprises at least one handle.

21. An aircraft brake bag expander as claimed in claim 18 wherein the orientation fixing means comprises at least a part suitable for locking with at least part of the aircraft axle.

22. An aircraft brake bag expander as claimed in claim 18 wherein the expander further comprises a recess in its peripheral surface for engaging a protruding part of a brake bag to be expanded.

* * * * *